3,244,789
PROCESS FOR THE PRODUCTION OF THIN
CONDENSER FOILS FROM PLASTICS
Hermann Hofmeier, Dormagen, Germany, assignor to
Farbenfabriken Bayer Aktiengesellschaft, Leverkusen,
Germany, a corporation of Germany
No Drawing. Filed June 22, 1962, Ser. No. 204,617
15 Claims. (Cl. 264—337)

The present invention relates to a special process for the manufacture of thin condenser foils from synthetic plastics, with which a quite special supporting foil is used.

It is already known that thin condenser foils can be produced from synthetic plastics if a support material is coated with a plastic layer, the support material is dried together with the plastic foil, if required the plastic foil is metallized in vacuum and thereafter the plastic foil is separated again from the support material. Hitherto, only paper has been used as support material, which is coated with a layer of polystyrene for improving the surface. This surface improvement is necessary, so that on the one hand the plastic foil adheres sufficiently firmly to the support material and on the other hand can be detached from the said material without tearing. The surface improvement of the support material complicates this process and necessitates a considerable technical expense.

There is an urgent demand in industry for support materials which as such already possess the following properties:
(1) Adequate mechanical strength.
(2) A sufficiently smooth surface, so that the condenser foil can easily be stripped off again.
(3) A surface with adequate adhesion, so that during the processing, such as cutting and metallizing under high vacuum, the condenser foil is not detached from the supporting foil.
(4) Resistance to solvent, so that as many different solvents as possible can be used for dissolving the synthetic plastics used for the condenser foil.
(5) Resistance to temperature, so that metallizing under vacuum can be carried out at relatively high temperatures.
(6) They must not contain any substances which volatize in vacuum (for example plastizers).

It has now been found that a thin condenser foil is obtained in a particularly simple manner from synthetic plastics, by coating a supporting foil with a plastic solution, drying the supporting foil with the coating, if required metallizing the condenser foil under high vacuum and stripping the condenser foil from the supporting foil, if a cellulose hydrate foil is used as the supporting foil.

In conformity with general usage, by "condenser foil" according to the invention, there is merely understood the foil which is disposed as a dielectric between the metal layers in a condenser. The "metallized condenser foil" then covers the condenser foil in the stricter sense and the metal layer.

It is to be considered as extremely surprising that the cellulose hydrate foils used according to the invention satisfy the aforesaid 6 requirements in a particularly satisfactory manner. It is very surprising in this connection that the cellulose hydrate foils, show on the one hand a sufficiently high bonding strength for the condenser foil without any surface improvement being necessary and on the other hand can be separated in a particularly easy manner from the said foil. The conventional film-forming polymers are to be considered as plastics for the production of the condenser foils, for example cellulose esters, cellulose ethers, polystyrene, polyurethanes and more especially polycarbonates. The polycarbonate of 4,4′-dihydroxydiphenyl-2,2-propane has proved to be particularly suitable among the polycarbonates.

For coating the supporting foil, solutions of these film formers are used. As solvents, it is possible to use all organic solvents, since cellulose hydrate is not soluble in any of these solvents. Suitable solvents are for example methylene chloride, chloroform, acetone, benzene, hydroaromatic compounds, ketones, esters and glycols and glycol esters. Mixtures of these solutions can also be used.

The cellulose hydrate foil advantageously has a thickness between 0.01 and 0.05 mm. It consists of a regenerated cellulose. It can be prepared by the processes known per se, for example by the cuprammonium process or the viscose process. The cellulose solutions are forced in known manner through slit nozzles into precipitation baths. It is particularly important that the cellulose hydrate foils can be used immediately for the use in accordance with the invention. Surface improvement thereof is not necessary.

The coating of the supporting foil with the condenser foil is carried out in a manner known per se by using solutions containing the plastics to be used for the condenser foils. Various dipping processes are used with particular advantage. If a coating on one side of the supporting foil is required, this foil is allowed to run over a roller which just contacts the surface of the plastic solution, but if coating on both sides is desired, the roller must be completely immersed in the plastic solution. The thickness of the condenser foil is substantially dependent on the viscosity of the plastic solution and the speed at which the supporting foil is conducted through the solution. Both processes permit the production of very thin condenser foils.

In addition to the dipping process, it is also possible to employ the normal casting process, with which a plastic solution is cast on to a support foil. After the coating, the support foil is dried together with the film former and the solvent evaporates.

The thickness of the condenser foil is between approximately 0.5 to 6μ, advantageously between 1 and 4μ.

The condenser foil is preferably metallized by vaporization while it is still on the support foil. The metallization is likewise effected in known manner under high vacuum. Aluminum and zinc in particular as well as silver and copper, are to be considered as suitable metals.

The processing step of the vapor-coating can also be effected after the condenser foil has been separated from the support foil. However, this form of the invention is only used when there are very special reasons therefore, because the condenser foil can tear very easily, because it is so thin. It is particularly simple to detach the condenser foil from the cellulose hydrate foil. Simple mechanical detachment is quite sufficient and there is no tearing, even with very thin condenser foils. The detachment can be further facilitated by varying the moisture content of the medium in which the support foil with the condenser foil is located. The cellulose hydrate foil reacts in a particularly sensitive manner to such differences in moisture. In general, it is sufficient to change the moisture content of the air. The foils can however be directly introduced into steam or even into water. The cellulose hydrate foil being used according to the invention then quickly takes up considerable quantities of water and swells. As a result, the union between condenser foil and supporting foil is loosened, so that separation can easily be carried out.

*Example 1*

A cellulose hydrate foil with a thickness of about 0.03 mm. is provided on one side with a coating of cellulose triacetate with a thickness of 0.005 mm., using a coating machine. As casting solution, there is used a substantially 10% solution of cellulose triacetate in methylene chloride-chloroform (2:1), to which are added 10 parts of butanol to 100 parts of triacetate. The drying of the foil strip is effected in a drying chamber at 40–100°. The coating adheres firmly to the support. If the foil is briefly drawn through water, it is easily possible to strip off the triacetate layer without damage.

The condenser foil can however also be first of all metallized and only then stripped off. For this purpose, the foil strip which is obtained is vapor-treated on the cellulose triacetate side in known manner and continuously with an aluminum layer with a maximum thickness of 0.001 mm. A margin with a width of 1 mm. is kept free from metal on one side of the strip by screening. The metallized strip is then unwound from the reel and guided through a moist chamber with 80% relative air humidity. As a result, the union between supporting foil and metallized condenser foil is loosened in such a way that the two layers of foil can be separated easily from one another. The metallized cellulose acetate layer is then used immediately for the winding of a condenser.

*Example 2*

A cellulose hydrate foil with a thickness of 0.02 mm. is coated by the immersion process on one side with the polycarbonate of 4,4'-dihydroxydiphenyl-2,2-propane. As coating solution, there is used a 3% solution of the polycarbonate in methylene chloride. The supporting foil is moved at a speed of 3 meters per minute over the surface of the coating solution. The foils then run through a heating chamber, in which the methylene chloride is vaporized at about 35° C. In the dry state, the polycarbonate foil has a thickness of about $3\mu$.

The metallizing is effected as set out in Example 1. After the metallized foil has left the high vacuum chamber, it is brought into a normal air with a relative humidity content of 50%. In the high vacuum chamber, the humidity is substantially lower. Already the transfer from the high vacuum chamber to the normal room atmosphere has the effect that the condenser foil can be detached without damage from the supporting foil. A polycarbonate foil is obtained which has a thickness of $3\mu$ with an aluminum layer with a maximum thickness of 0.001 mm.

We claim:

1. In the process for the production of thin condenser foils of a synthetic plastic based upon a film forming polymer wherein said plastic is a member selected from the group consisting of cellulose ethers, cellulose esters, polystyrene, polyurethanes, and polycarbonates by coating a supporting foil with a solution of a plastic in a solvent inert to the supporting foil, drying the plastic coating on the supporting foil to form a thin condenser film adhering thereto, and stripping said condenser foil from the supporting foil, the improvement which comprises using a cellulose hydrate foil as the supporting foil.

2. Improvement according to claim 1, wherein the supporting foil is treated with moist air before stripping the condenser foil from the supporting foil.

3. Improvement according to claim 1, wherein the supporting foil is treated with steam before stripping the condenser foil from the supporting foil.

4. Improvement according to claim 1, wherein the supporting foil is treated with liquid water before stripping the condenser foil from the supporting foil.

5. In the process for the production of thin metallized condenser foils of synthetic plastic based upon a film forming polymer wherein said plastic is a member selected from the group consisting of cellulose ethers, cellulose esters, polystyrene, polyurethanes, and polycarbonates by coating a supporting foil with a solution of such plastic in a solvent inert to the supporting foil, drying the plastic coating on the supporting foil to form a thin plastic film adhering thereto, metallizing the exterior surface of said condenser film, and stripping the metallized condenser foil from the supporting foil, the improvement which comprises using a cellulose hydrate foil as the supporting foil.

6. The improvement according to claim 5 wherein the cellulose hydrate foil has a thickness within the range 0.01 and 0.05 millimeter and wherein said plastic is a polycarbonate of 4,4'-dihydroxydiphenyl-2,2-propane.

7. Improvement according to claim 5, wherein the supporting foil is treated with moist air before stripping the metallized condenser foil from the supporting foil.

8. Improvement according to claim 5 wherein the suping foil is treated with steam before stripping the metallized condenser foil from the supporting foil.

9. Improvement according to claim 5, wherein the suping foil treated with liquid water before stripping the metallized condenser foil from the supporting foil.

10. A process for the production of thin condenser foils made of cellulose triacetate which comprises coating a cellulose hydrate foil with a solution of cellulose triacetate in a solvent inert to cellulose hydrate, drying the coating on the supporting foil to form a cellulose triacetate foil adhering thereto, said drying being carried out at temperatures between 40 to 100° C., drawing the supporting foil and adherent cellulose triacetate foil through water to loosen the adhesion therebetween, and stripping the cellulose triacetate foil from the cellulose hydrate foil.

11. The process of claim 10 wherein the exterior surface cellulose triacetate foil is metallized with aluminum in a vacuum chamber after drying on the cellulose hydrate supporting foil, and before drawing through the water.

12. The process of claim 11 wherein a cellulose hydrate supporting foil having a thickness of approximately 0.03 millimeters is used, and the cellulose triacetate coating has a thickness of approximately 0.005 millimeter, and the thickness of the metallized aluminum layer is 0.001 millimeter maximum.

13. A process for the production of thin condenser foils made of polycarbonate of 4,4-dihydroxydiphenyl-2,2-propane which comprises immersing one side of a cellulose hydrate supporting foil in a coating solution containing 3 percent of the aforesaid polycarbonate in methylene chloride, moving said supporting foil at a speed of approximately 3 meters per second over the surface of said coating solution, drying the coated supporting foil at a temperature of about 35° C. to vaporize the methylene chloride in the coating, and to form a polycarbonate foil having a thickness of about 3 microns, drawing the supporting foil and adherent polycarbonate foil through water, and stripping said polycarbonate foil from said supporting foil.

14. The process of claim 13 wherein the exterior surface of the polycarbonate foil is metallized with aluminum in a vacuum chamber after drying and before drawing through water, the thickness of said metallized aluminum coating being about 0.001 millimeter maximum.

15. A process for the production of thin condenser foils made of polycarbonate of 4,4-dihydroxydiphenyl-2,2-propane which comprises immersing one side of a cellulose hydrate supporting foil in a coating containing 3% of the aforesaid polycarbonate in methylene chloride, moving said supporting foil at a speed of approximately 3 meters per second over the surface of said coating solution, drying the coated supporting foil at a temperature of about 35° C. to vaporize the methylene chloride in the coating, and to form a polycarbonate foil having a thickness of about 3 microns, metallizing said polycarbonate foil with aluminum in a vacuum chamber after drying to form a metallized aluminum coating having a thickness of approximately 0.001 millimeter maximum adherent thereto, and bringing said metallized polycarbonate foil on said supporting foil into contact with normal air having a relative humidity of about 50%, whereby the humidity of said air reduces the adhesion between the metallized polycarbonate foil and the supporting foil to permit said metallized polycarbonate foil to be stripped therefrom.

References Cited by the Examiner

UNITED STATES PATENTS

| | | | |
|---|---|---|---|
| 2,236,648 | 4/1941 | Nagee et al. | 264—218 |
| 2,254,263 | 9/1941 | Bratring | 264—338 |
| 2,320,473 | 6/1943 | Rooney et al. | 264—308 |
| 2,328,333 | 8/1943 | Freeman et al. | 18—47 |
| 2,622,278 | 12/1952 | Eckler et al. | 18—47 |
| 2,784,763 | 3/1957 | Shorts | 18—47 |
| 2,867,552 | 1/1959 | Homer | 117—217 |
| 2,964,797 | 12/1960 | Peilstocker et al. | 264—216 |
| 2,994,111 | 8/1961 | Koss et al. | 264—338 |
| 3,006,785 | 10/1961 | Canegallo | 117—217 |

ALEXANDER H. BRODMERKEL, *Primary Examiner.*